(12) United States Patent
Barron et al.

(10) Patent No.: US 7,736,430 B2
(45) Date of Patent: Jun. 15, 2010

(54) COMPOSITIONS AND METHODS FOR CONTROLLING THE SETTING BEHAVIOR OF CEMENT SLURRIES USING CARBONATED FLY ASH

(75) Inventors: Andrew R. Barron, Houston, TX (US); Corina Lupu, Pearland, TX (US); Katherine L. Jackson, Colonie, NY (US); Sean Bard, College Statian, TX (US); Gary Funkhouser, Duncan, OK (US)

(73) Assignees: William Marsh Rice University, Houston, TX (US); Halliburton Energy Services, Inc., Duncan, OK (US)

( * ) Notice: Subject to any disclaimer, the term of this patent is extended or adjusted under 35 U.S.C. 154(b) by 1027 days.

(21) Appl. No.: 11/377,800

(22) Filed: Mar. 16, 2006

(65) Prior Publication Data

US 2007/0215353 A1    Sep. 20, 2007

(51) Int. Cl.
    C04B 18/06    (2006.01)
(52) U.S. Cl. .................. 106/705; 106/DIG. 1; 423/232
(58) Field of Classification Search ............ 106/DIG. 1, 106/705; 423/232
    See application file for complete search history.

(56) References Cited

U.S. PATENT DOCUMENTS

| 5,518,540 A * | 5/1996 | Jones, Jr. ..................... 106/638 |
| 5,650,562 A * | 7/1997 | Jones, Jr. ........................ 73/38 |
| 6,264,736 B1 * | 7/2001 | Knopf et al. ................. 106/682 |
| 6,334,895 B1 * | 1/2002 | Bland .......................... 106/705 |
| 6,387,174 B2 * | 5/2002 | Knopf et al. ................. 106/738 |
| 6,517,631 B1 * | 2/2003 | Bland .......................... 106/705 |

OTHER PUBLICATIONS

JP 60233183 A (Watanabe et al.) Nov. 19, 1985; abstract only.*
JP 10151429 A (Nishida) Jun. 9, 1998; abstract only.*
JP 2002086097 (Hirose) Mar. 26, 2002; abstract only.*

* cited by examiner

*Primary Examiner*—Paul Marcantoni
(74) *Attorney, Agent, or Firm*—Baker Botts L.L.P.

(57) ABSTRACT

A method of treating fly ash to modify the set time and the induction profile for a slurry comprising cement and the fly ash. The method comprising mixing fly ash with an aqueous solution comprising the calcium carbonate, thereby modifying the set time and the induction profile of the slurry comprising cement and the fly ash. A method of treating fly ash to modify the induction profile of a slurry comprising cement and the fly ash. The method comprising contacting fly ash with a wet gas stream comprising water vapor and carbon dioxide in an amount sufficient to react with the fly ash so as to modify the induction profile of the slurry comprising cement and the fly ash. Cement compositions comprising water, hydraulic cement, and carbonated fly, and associated methods of use.

18 Claims, 4 Drawing Sheets

COMPOSITIONS AND METHODS FOR CONTROLLING THE SETTING BEHAVIOR OF CEMENT SLURRIES USING CARBONATED FLY ASH

BACKGROUND

The present disclosure relates to carbonated fly ash and a method of making the same. The present disclosure further relates to the use of the carbonated fly ash to control the setting behavior of cement slurries.

During the combustion of coal, a secondary by-product commonly referred to as "fly ash" is obtained. Fly ash typically comprises fine powders that contain polycrystalline particles generally having spherical, hexagonal and tubular shapes, with sizes ordinarily ranging from 1-100 μm range (ca. 30%) as well as amorphous particles (ca. 70%). They are lightweight materials and possess a complex chemical composition generally comprising silica ($SiO_2$), alumina ($Al_2O_3$), iron oxide ($Fe_2O_3$), calcium oxide (CaO), sulphates (e.g., $Na_2SO_4$) and other small amounts of oxides and minerals formed from a combination of these. Fly ash is commonly classified based on its calcium oxide content: Class C (ca. 15-30% CaO), Class F (ca. 5-10% CaO) and Class I (ca. 10-20% CaO). The use of fly ash is a function of its chemical composition and microstructure. Upon hydration, some of the fly ash particles react very fast and others are chemically inactive for longer period of times (more than two years). Class F fly ash is generally not cementitious, but has pozzolanic properties, in that it can undergo a cementitious reaction when mixed with water and free lime or calcium hydroxide. In contrast, due to its increased calcium oxide content, Class C fly ash, in addition to pozzolanic properties, also has cementitious properties, in that it can undergo a cementitious reaction when mixed with water.

There is a national demand to protect the environment, conserve energy, and reduce costs of disposal of the secondary materials resulted from power plants, as well as find them new economical applications. Additionally, the large quantities of fly ash that are collected during the combustion of coal can add undesirable costs to the production of electricity due to the environmental concerns associated with the fly ash's disposal. Accordingly, due to its pozzolanic and/or cementitious properties, there have been substantial efforts to increase the use of fly ash in industries such as the well construction, road construction, and building construction industries. For instance, fly ash has been proposed as a low cost additive for downhole cements in well construction. However, because the properties of fly ash when set are generally not sufficient for many applications, it is common to mix cement and fly ash. Due to its low calcium oxide content, Class F fly ash may have the role of inert filler when mixed with cement. Class C fly ash, however, can be activated and become cementitious once added to the cement slurry.

The addition of fly ash to cement slurries results in the modification of its physical and mechanical properties including, workability, strength, shrinkage, porosity, and permeability. However, it is desirable to understand the chemical role of fly ash and to find ways to control and tune its properties in order to obtain the response desired. In particular, methods are sought of extending the setting time as well as providing enhanced stability during the induction period of cement hydration. Stability during the induction period of cement hydration is desirable during well cementing applications where it is necessary to pump a specific viscosity cement slurry over large distances within a specific time, without changes in viscosity that would undesirably effect pump rates and the like. Extension of the setting time may be particularly desirable in deep-well applications where set retarding additives, such as lignosulfonates, are commonly included in the cement slurries.

SUMMARY

The present disclosure relates to carbonated fly ash and a method of making the same. The present disclosure further relates to the use of the carbonated fly ash to control the setting behavior of cement slurries.

An embodiment of the present invention provides a method of treating fly ash to modify the set time and the induction profile for a slurry comprising cement and the fly ash. The method comprises providing the fly ash and providing an aqueous solution comprising calcium carbonate. The method further comprises mixing the fly ash with the aqueous mixture, thereby modifying the set time and the induction profile of the slurry comprising cement and the fly ash.

Another embodiment of the present invention provides a method of treating fly to modify the induction profile of a slurry comprising cement and the fly ash. The method comprises providing the fly ash and providing a wet gas stream comprising water vapor and carbon dioxide in an amount sufficient to react with the fly ash so as to modify the induction profile of the slurry comprising cement and the fly ash. The method further comprises contacting the fly ash with the wet gas stream.

Another embodiment of the present invention provides a method of cementing. The method comprises providing a cement slurry comprising water, hydraulic cement, and carbonated fly ash. The method further comprises introducing the cement slurry into a subterranean formation. The method further comprises allowing the cement slurry to set in the subterranean formation.

Another embodiment of the present invention provides a composition comprising carbonated fly ash.

Another embodiment of the present invention provides a cement slurry comprising water, a hydraulic cement, and carbonated fly ash.

The features and advantages of the present disclosure will be apparent to those skilled in the art. While numerous changes may be made by those skilled in the art, such changes are within the spirit of the invention.

BRIEF DESCRIPTION OF THE FIGURES

A more complete understanding of this disclosure may be acquired by referring to the following description taken in combination with the accompanying figures.

Figure 1:
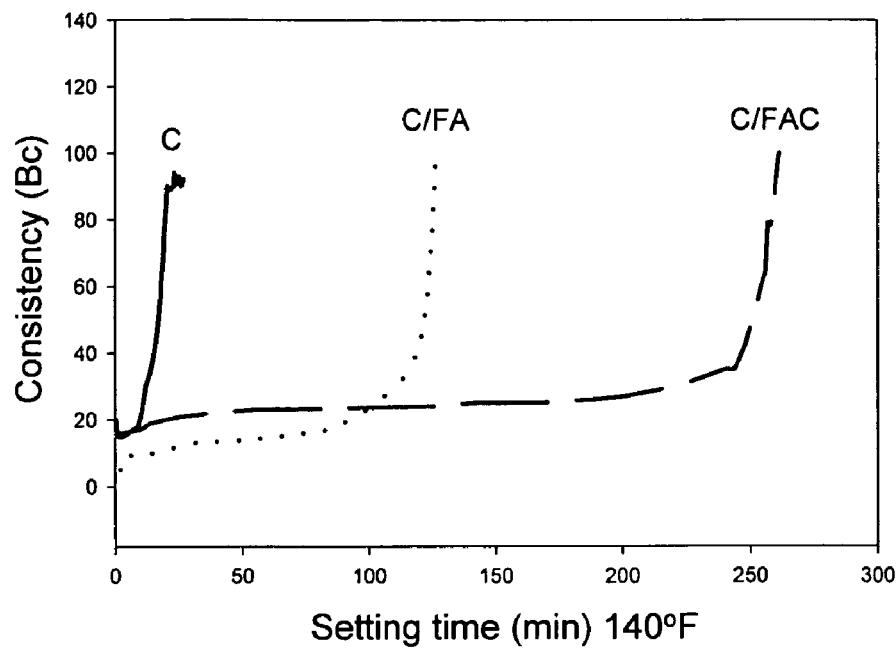
FIG. 1 is a plot of consistency (Bc) measured at 140° F. as a function of time for a sample cement slurry that comprised cement (C), a sample cement slurry that comprised a cement/fly ash mixture (C/FA), and a sample cement slurry that comprised a cement/carbonated fly ash mixture (C/CFA).

While the present disclosure is susceptible to various modifications and alternative forms, specific example embodiments have been shown in the figures and are described below in more detail. It should be understood, however, that the description of specific example embodiments is not intended to limit the invention to the particular forms disclosed, but on the contrary, this disclosure is to cover all modifications and equivalents as defined by the appended claims.

DESCRIPTION

The present disclosure relates to carbonated fly ash and a method of making the same. The present disclosure further relates to the use of the carbonated fly ash to control the setting behavior of cement slurries. As used herein, the term "carbonated fly ash" refers to fly ash that has been treated so that at least a portion of the calcium compounds in fly ash particles have been at least partially converted to calcium carbonate. Inclusion of the carbonated fly ash in a cement slurry may provide extended set time, as compared to the inclusion of fly ash that has not been treated in accordance with the methods disclosed herein. Further, inclusion of the carbonated fly ash in a cement slurry also may enhance the stability of the slurry's induction period as compared to the inclusion of fly ash that has not been treated in accordance with the methods disclosed herein.

Carbonated fly ash may be obtained by any suitable methodology. Generally, the methods of the present invention comprise treating fly ash to obtain carbonated fly ash. In some embodiments, fly ash may be mixed with an aqueous solution that comprises calcium carbonate, thereby obtaining carbonated fly ash. Furthermore, in some embodiments, fly ash may be contacted by a wet gas stream that comprises water vapor and carbon dioxide, thereby obtaining carbonated fly ash.

Any of a variety of fly ashes obtained from the combustion of coal may be suitable for use. Suitable fly ashes include those classified as Class C fly ash, Class F fly ash, and Class I fly ash.

An example of a suitable method for treating fly ash generally comprises mixing fly ash with an aqueous solution that comprises calcium carbonate. It is believed that the fly ash reacts with this calcium carbonate solution so that some of the calcium salts on the fly ash particles surfaces are at least partially converted to calcium carbonate and/or some of the calcium carbonate from solution is deposited onto the fly ash particle. The carbonated fly ash obtained from mixing the fly ash with the calcium carbonate solution should have modified chemical and physical properties so that when it is included in a cement slurry, the cement slurry may have an extended set time and a more stable induction period, as compared to a cement slurry containing fly ash that has not been treated in accordance with the methods disclosed herein.

The fly ash should be mixed with the calcium carbonate solution for a period of time sufficient to provide the desired chemical and physical properties of the carbonated fly ash. An appropriate mixing time for a particular application depends on a number of factors, including the calcium carbonate concentration, the particular fly ash used, and the desired induction profile and setting time for a cement slurry comprising the carbonated fly ash. For example, for a calcium carbonate concentration of about 0.02 moles/L, in some embodiments, the fly ash may be mixed with the calcium carbonate solution for a period of time in the range of from about 10 minutes to about 6 hours.

The calcium carbonate solutions resulted after filtration of the treated fly ash were analyzed by ICP-AES (Atomic Emission Spectrometry). The samples were digested with a nitric acid solution and then analyzed for Al, Ca, Fe, Mg, Na, Si, and I. Phosphorus analysis was performed calorimetrically using the Hach Test 'N Tube method 8190 for total phosphorus. Table 1 below shows the ICP results for the calcium carbonate solutions.

In some embodiments, the method of treating the fly ash further may comprise flowing a gas stream comprising carbon dioxide through the mixture of the fly ash and the calcium carbonate solution exposed to continuous mixing. The gas stream may be any suitable gas stream that contains a sufficient amount of carbon dioxide to facilitate the dissolution of calcium carbonate in the solution.

In some embodiments, the method of treating the fly ash further may comprise heating the mixture of the fly ash and the calcium carbonate solution. While this mixture may be heated, it should be understood that heating is not necessary to obtain the desired treatment of the fly ash. This mixture of the fly ash and the calcium carbonate solution generally may be heated while the fly ash and the calcium carbonate solution are being mixed. For example, in some embodiment, mixing the fly ash and the calcium carbonate solution may occur at a temperature in the range of from about 20° C. to about 50° C.

In some embodiments, the method of treating the fly ash further may comprise removing the fly ash from the mixture of the fly ash and the calcium carbonate solution. In some embodiments, at least a substantial portion of the fly ash may be removed from the mixture. Any suitable separation technique may be used to achieve this separation.

In some embodiments, the method of treating the fly ash further may comprise drying the fly ash that was removed from the mixture of the fly ash and the calcium carbonate solution. The fly ash may be dried using any suitable technique. In some embodiments, drying the fly ash may comprise heating the fly ash. In some embodiments, the fly ash may be dried in an oven having a temperature in the range of from about 80° C. to about 110° C.

In addition to the above-described treatment with a calcium carbonate solution, another example method for treating fly ash generally comprises contacting fly ash with a wet gas stream that comprises water vapor and carbon dioxide in an amount sufficient to react with the fly ash so as to modify the induction profile of a cement slurry that comprises the fly ash. It is believed that the fly ash reacts with this wet gas stream so that at least any calcium containing fly ash particles can react with the wet carbon dioxide and form calcium carbonate and calcium bicarbonate on the fly ash particles. The carbonated fly ash obtained from contacting the fly ash with the wet gas stream should have modified chemical and physical properties so that when it is included in a cement slurry, the cement slurry should have a more stable induction period, as compared to slurry comprises fly ash that has not been treated in accordance with the methods disclosed herein. An additional change in the setting time may also be accomplished by the above-described treatment.

The fly ash should be contacted with the wet gas stream comprising the water vapor and the carbon dioxide for a period of time sufficient to provide the desired chemical and physical properties of the carbonated fly ash. An appropriate contact time for a particular application depends on a number of factors, including the carbon dioxide concentration, temperature, the particular fly ash used, and the desired induction profile for a cement slurry comprising the carbonated fly ash. For example, the fly ash may be contacted with the wet gas stream for a period of time in the range of from about 2 hours to about 10 hours.

In some embodiments, the wet gas stream may be obtained by flowing a gas stream that comprises carbon dioxide through a volume of water. The gas stream may be any suitable gas stream that contains a sufficient amount of carbon dioxide. In one particular embodiment, the gas stream may be an exhaust stream from one or more pieces of mechanical equipment, such as a cement mixer. One of ordinary skill in the art should be able to determine an appropriate water content of the vapor stream in order to stop the cementitious setting of the fly ash during the treatment.

In accordance with the methods of the present disclosure, the gas comprising the carbon dioxide should be flowed through the volume of water under conditions effective to wet this gas stream, in that after flowing through the volume of water the gas stream should further comprise water vapor. In some embodiments, the water vapor may be present in the wet gas stream in an amount in the range of from about 5% to about 30% by weight of the wet gas stream.

While the wet gas stream may contain additional gases, such as oxygen and nitrogen, the dissolved carbon dioxide should be present in the wet gas stream in an amount sufficient to react with the fly ash so as to modify the induction profile of the fly ash. In some embodiments, the wet gas stream may comprise carbon dioxide in an amount greater than about 0.002 moles/L of the wet gas stream. In some embodiments, the wet gas stream may comprise carbon dioxide in an amount greater than about 0.01 moles/L of the wet gas stream. In some embodiments, the wet gas stream may comprise carbon dioxide in an amount greater than about 0.04 moles/L of the wet gas stream.

As discussed above, in some embodiments, to obtain carbonated fly ash, the fly ash may be mixed with a calcium carbonate solution Furthermore, in some embodiments, to obtain carbonated fly ash, the fly ash may be contacted by a wet gas stream that comprises water vapor and carbon dioxide. In some embodiments, to further modify the properties of the fly ash, these two treatments may be performed sequentially, in that fly ash that has been mixed with the calcium carbonate solution may then be contacted with the wet gas stream. Alternatively, fly ash that has been contacted with the wet gas stream may then be mixed with a calcium carbonate solution As discussed above, the carbonated fly ash may be included in a cement slurry. An example of a suitable cement slurry generally comprises water, a hydraulic cement, and carbonated fly ash. Inclusion of the carbonated fly ash in a cement slurry may provide extended set time, as compared to the inclusion of fly ash that has not been treated in accordance with the methods disclosed herein. Further, inclusion of the carbonated fly ash in a cement slurry also may enhance the stability of the slurry's induction period as compared to the inclusion of fly ash that has not been treated in accordance with the methods disclosed herein.

The cement slurries may include freshwater or saltwater (e.g., water containing one or more salts dissolved therein, seawater, brines, etc.). Generally, the water may be from any source, provided that it does not contain an excess of compounds that may adversely affect other components in the cement slurry. Dependent upon the particular application, the water may be included in the cement slurries of the present disclosure in an amount sufficient to form a pumpable slurry.

A variety of hydraulic cements may be utilized, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suitable for use are classified as Classes A, C, H, and G cements according to American Petroleum Institute, *API Specification for Materials and Testing for Well Cements*, API Specification 10, Fifth Ed., Jul. 1, 1990.

The cement slurries further comprise the above-described carbonated fly ash. Inclusion of the carbonated fly ash in the cement compositions of the present disclosure should provide extended set time and/or enhanced induction period stability.

The carbonated fly ash may be included in a cement slurry in any suitable hydraulic cement-to-carbonated fly ash weight ratio. In some embodiments, the hydraulic cement-to-carbonated fly ash weight ratio may be in the range of from about 80:20 to about 60:40. One of ordinary skill in the art should be able to determine an appropriate weight ratio for a particular application, based on a number of factors, including the desired cost for the cement slurry and the desired compressive strength, setting time, and induction period profile for the cement slurry.

A wide variety of additional additives may be included in the cement slurries as deemed appropriate by one skilled in the art, with the benefit of this disclosure. Examples of such additives include, but are not limited to, set retarding additives, accelerators, weight reducing additives, heavyweight additives, fluid loss control additives, lost circulation materials, dispersants, and combinations thereof. For example, a set retarding additive may be included in a cement slurry of the present disclosure to further extend the setting time of the cement slurry.

The cement slurries disclosed herein may be used in a variety of applications, including, but not limited to, well, road, and construction cementing. For example, the cement slurries may be particular suitable for primary and remedial cementing in subterranean formations.

An example of a method of the present disclosure comprises providing a cement slurry comprising water, hydraulic cement, and carbonated fly ash; introducing the cement slurry into a subterranean formation; and allowing the cement composition to set therein. In some embodiments, the cement slurry may be introduced into an annulus between a subterranean formation and a pipe string located in the subterranean formation. As desired by one of ordinary skill in the art, with the benefit of this disclosure, the cement slurries of the present disclosure useful in this method further may comprise any of the above-listed additives, as well any of a variety of other additives suitable for use in subterranean applications.

To facilitate a better understanding of the present disclosure, the following examples of specific embodiments are given. In no way should the following examples be read to limit or define the entire scope of the invention.

EXAMPLE 1

Carbonated fly ash was prepared in accordance with the following procedure. First, aqueous solutions that comprised calcium carbonate (0.1% to 0.6% by weight) were prepared by dissolving a predetermined amount of calcium carbonate in 100 ml of water under continuous stirring at 50° C. and bubbling of carbon dioxide. The stirring time was varied from 1 hour to 3 hours. Thereafter, the resulting calcium carbonate solutions were filtered to remove excess calcium carbonate. To these calcium carbonate solutions, specific amounts of Class C fly ash (obtained from ISG Resources) were added. The resultant mixture was stirred at 50° C. while bubbling carbon dioxide. The stirring time (reaction time) was varied from 1 hour to 6 hours. The resulting mixture was filtered and the filtrate was dried in an oven at 120° C. for about 12 hours.

The calcium carbonate solutions resulted after filtration of the treated fly ash were analyzed by ICP-AES (Atomic Emission Spectrometry). The samples were digested with a nitric acid solution and then analyzed for Al, Ca, Fe, Mg, Na, Si, and I. Phosphorus analysis was performed calorimetrically using the Hach Test 'N Tube method 8190 for total phosphoros. Table 1 below shows the ICP results for the calcium carbonate solutions.

TABLE 1

| Sample | Al | Ca | Fe | Mg | Na | Si | S | P |
|---|---|---|---|---|---|---|---|---|
| $CaCO_3$ Solution (0.2%) | <.05 | 712.2 | <0.05 | 338.2 | 93.3 | 63.3 | 650 | 1.6 |
| $CaCO_3$ Solution (0.4%) | <0.05 | 1167 | <0.26 | 627.2 | 178.9 | 87.1 | 603.9 | 4.1 |
| $CaCO_3$ Solution (0.6%) | <0.05 | 763.2 | <0.05 | 773.1 | 186 | 522 | 1357 | 2.6 |

The ICP analysis shown in Table 1 above indicates that sulfates (in particular those of Na and Mg) were removed from the fly ash during treatment with the calcium carbonate solution.

EXAMPLE 2

Samples were prepared in accordance with the following procedure. Each sample was dry blended and then mixed with water in a blender and strongly agitated (highest speed) for 35 seconds.

Sample No. 1 (C) comprised 600 g of Texas Lehigh Class A cement and 291.6 g of water.

Sample No. 2 (C/FA) comprised 360 g of Texas Lehigh Class A cement, 240 g of Class C fly ash, and 291.6 g of water. Accordingly, Sample No. 2 had a cement-to-fly ash weight ratio of 60:40.

Sample No. 3 (C/CFA) comprised 360 g of Texas Lehigh Class A cement, 240 g of carbonated Class C fly ash, and 291.6 g of water. Accordingly, Sample No. 3 had a cement-to-carbonated fly ash weight ratio of 60:40. The carbonated fly ash was prepared as described in Example 1 by reacting Class C fly ash with a calcium carbonate solution (0.4%) for 3 hours.

After sample preparation, the samples were placed in a consistometer (Chandler Engineering Model 1250 Atmospheric Consistometer). The consistency (Bc) of each sample was measured at 140° F. (60° C.), until 100 Bc was obtained. The time to reach 100 Bc (setting time) for each sample is shown in Table 2 below.

TABLE 2

| Sample | Class A Cement (g) | Class C Fly Ash (g) | Carbonated Class C Fly Ash (g) | Setting Time to 100 Bc at 140° F. (min) |
|---|---|---|---|---|
| Sample No. 1 (C) | 600 | — | — | 27 |
| Sample No. 2 (C/FA) | 360 | 240 | — | 127 |
| Sample No. 3 (C/CFA) | 360 | — | 240 | 260 |

Additionally, a plot of consistency (Bc) as a function of setting time (min.) for each sample is displayed in FIG. 1. Although the setting time was increased for Sample No. 2 (C/FA) by the addition of the fly ash, the profile corresponding to the induction period was not flat. However, as shown in FIG. 1, the substitution of the fly ash with carbonated fly ash in Sample No. 3 (C/CFA) increased the setting time and significantly changed the profile of the setting curve, in that the induction profile for Sample No. 3 (C/CFA) was flat and controlled. Accordingly, Example 2 indicates that the slurry that comprised the cement/carbonated fly ash mixture reached a specific viscosity that remained constant until setting took place at a time in excess of the slurry that comprised the cement/fly ash mixture.

EXAMPLE 3

Samples were prepared in accordance with the following procedure. Each sample was dry blended and then mixed with water in a blender and strongly agitated (highest speed) for 35 seconds.

Sample No. 4 (C) comprised 700 g of Texas Lehigh Class A cement and 275.95 g of water.

Sample No. 5 (C/FA) comprised 335.79 g of Texas Lehigh Class A cement, 264.1 g of Class C fly ash, and 291.6 g of water. Accordingly, Sample No. 5 had a cement-to-fly ash weight ratio of 56:44.

Sample No. 6 (C/CFA) comprised 335.75 g of Texas Lehigh Class A cement, 264.36 g of carbonated Class C fly ash, and 291.6 g of water. Accordingly, Sample No. 6 had a cement-to-carbonated fly ash weight ratio of 56:44. The carbonated fly ash was prepared as described in Example 1 by reacting Class C fly ash with a calcium carbonate solution (0.2%) for 3 hours.

After sample preparation, the samples were placed in a consistometer (Chandler Engineering Model 1250 Atmospheric Consistometer). The consistency (Bc) of each sample was measured at 120° F. (48.9° C.), until 100 Bc was obtained. The time to reach 100 Bc (setting time) for each sample is shown in Table 3 below.

TABLE 3

| Sample | Class A Cement (g) | Class C Fly Ash (g) | Carbonated Class C Fly Ash (g) | Setting Time to 100 Bc at 120° F. (min) |
|---|---|---|---|---|
| Sample No. 4 (C) | 700 | — | — | 99 |
| Sample No. 5 (C/FA) | 335.75 | 246.36 | — | 167 |
| Sample No. 6 (C/CFA) | 335.75 | — | 246.36 | 252.3 |

Figure 2:
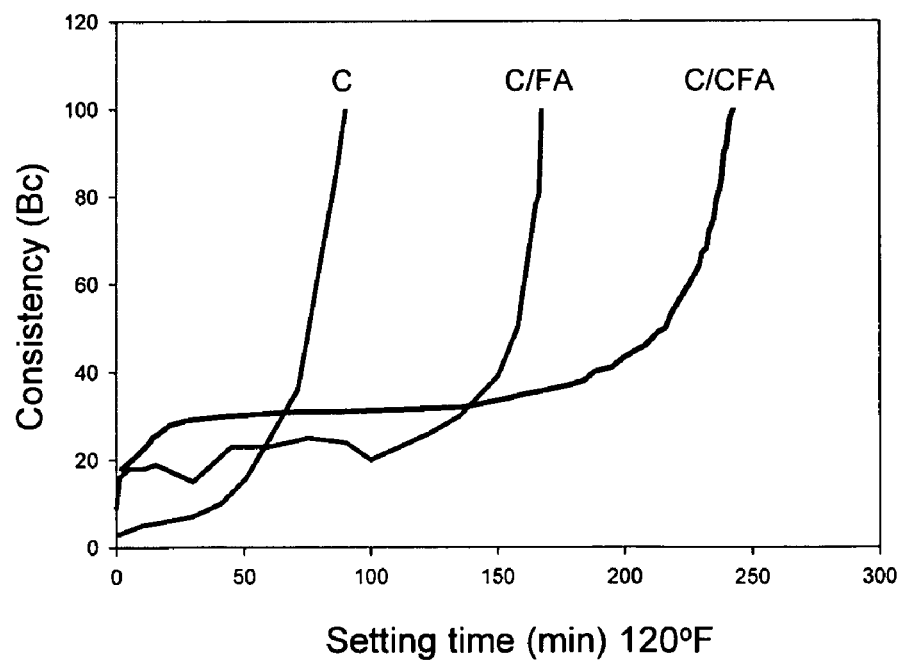
FIG. 2 is a plot of consistency (Bc) measured at 120° F. as a function of time for a sample cement slurry that comprised cement (C), a sample cement slurry that comprised a cement/fly ash mixture (C/FA), and a sample cement slurry that comprised a cement/carbonated fly ash mixture (C/CFA).

Additionally, a plot of consistency (Bc) as a function of setting time (min.) for each sample is displayed in FIG. 2. Although the setting time was increased for Sample No. 5 (C/FA) by the addition of the fly ash, the profile corresponding to the induction period was not flat. However, as shown in FIG. 2, the substitution of the fly ash with carbonated fly ash in Sample No. 6 (C/CFA) increased the setting time and significantly changed the profile of the setting curve, in that the induction profile for Sample No. 6 (C/CFA) was flat and controlled. Accordingly, Example 3 indicates that the slurry that comprised the cement/carbonated fly ash mixture reached a specific viscosity that remained constant until setting took place at a time in excess of the slurry that comprised the cement/fly ash mixture.

EXAMPLE 4

Samples were prepared in accordance with the following procedure. Each sample was dry blended and then mixed with water in a blender and strongly agitated (highest speed) for 35 seconds.

Sample No. 7 (C+R) comprised 700 g of Texas Lehigh Class A cement, 275.95 g of water, and 0.7 g of HR®-5 retarder (obtained from Halliburton Energy Services, Inc.).

Sample No. 8 (C/FA+R) comprised 335.75 g of Texas Lehigh Class A cement, 264.36 g of Class C fly ash, 291.6 g of water, and 0.33 g of HR®-5 retarder (obtained from Halliburton Energy Services, Inc.). Accordingly, Sample No. 8 had a cement-to-fly ash weight ratio of 56:44.

Sample No. 9 (C/CFA+R) comprised 335.75 g of Texas Lehigh Class A cement, 264.36 g of carbonated Class C fly ash, 291.6 g of water, and 0.33 g of HR®-5 retarder (obtained from Halliburton Energy Services, Inc.). Accordingly, Sample No. 9 had a cement-to-carbonated fly ash weight ratio of 56:44. The carbonated fly ash was prepared as described in Example 1 by reacting Class C fly ash with a calcium carbonate solution (0.2%) for 3 hours.

After sample preparation, the samples were placed in a consistometer (Chandler Engineering Model 1250 Atmospheric Consistometer). The consistency (Bc) of each sample was measured at 120° F. (48.9° C.), until 100 Bc was obtained. The time to reach 100 Bc (setting time) for each sample is shown in Table 4 below.

TABLE 4

| Sample | Class A Cement (g) | Class C Fly Ash (g) | Carbonated Class C Fly Ash (g) | HR ®-5 Retarder (g) | Setting Time to 100 Bc at 120° F. (min) |
|---|---|---|---|---|---|
| Sample No. 7 (C + R) | 700 | — | — | 0.7 | 100 |
| Sample No. 8 (C/FA + R) | 335.75 | 264.36 | — | 0.33 | 182 |
| Sample No. 9 (C/CFA + R) | 335.75 | — | 264.36 | 0.33 | 264 |

Figure 3:
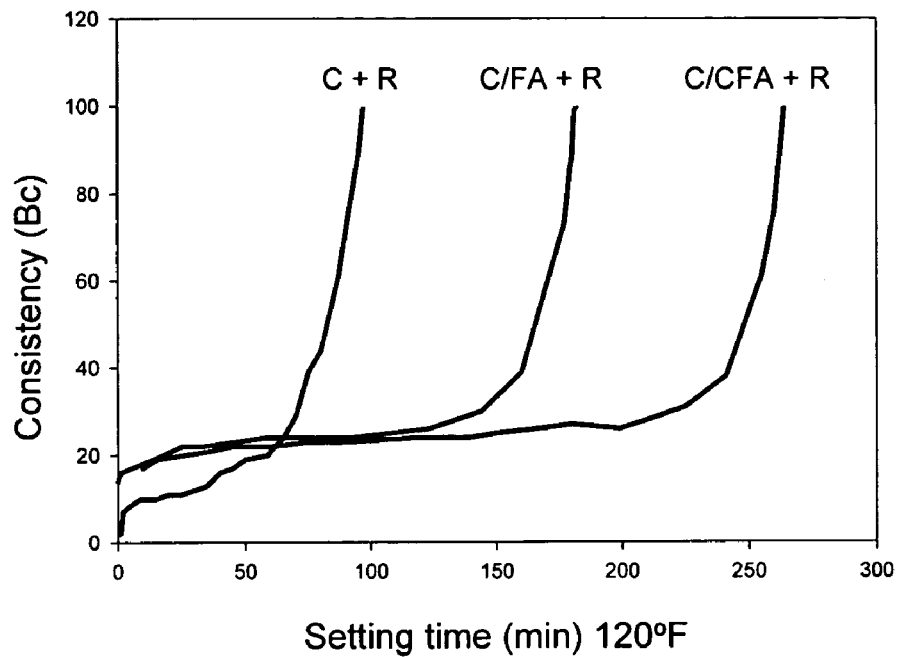
FIG. 3 is a plot of consistency (Bc) measured at 120° F. as a function of time for a sample cement slurry that comprised cement and a retarder (C+R), a sample cement slurry that comprised a cement/fly ash mixture and a retarder (C/FA+R), and a sample cement slurry that comprised a cement/carbonated fly ash mixture and a retarder (C/CFA+R).

Additionally, a plot of consistency (Bc) as a function of setting time (min.) for each sample is displayed in FIG. 3. Although the setting time was increased for Sample No. 8 (C/FA) by the addition of the fly ash, the profile corresponding to the induction period was not flat. However, as shown in FIG. 3, the substitution of the fly ash with carbonated fly ash in Sample No. 9 (C/CFA) increased the setting time and significantly changed the profile of the setting curve, in that the induction profile for Sample No. 9 (C/CFA) was flat and controlled. Accordingly, Example 4 indicates that the slurry that comprised the cement/carbonated fly ash mixture and the retarder reached a specific viscosity that remained constant until setting took place at a time in excess of the slurry that comprised the cement/fly ash mixture and the retarder.

EXAMPLE 5

To determine how setting time varies with the reaction time between the fly ash and the calcium carbonate solutions, the following experiments were performed. Sample Nos. 10-13 were prepared in accordance with the following procedure. First, 360 g of Texas Lehigh Class A cement were dry blended with 240 grams of carbonated fly ash in a cement-to-carbonated fly ash weight ratio of 60:40. The carbonated fly ash was prepared as described in Example 1 by reacting Class C fly ash with a calcium carbonate solution (0.2%) for 1 to 6 hours. For Sample No. 10, indicated in Table 5 below having a reaction time of 0 hours, the fly ash was not treated with the calcium carbonate solution. Next, the samples were mixed with water in a blender and strongly agitated (highest speed) for 35 seconds.

After sample preparation, the samples were placed in a consistometer (Chandler Engineering Model 1250 Atmospheric Consistometer). The consistency (Bc) of the sample was measured at 140° F. (60° C.), until 100 Bc was obtained. The time to reach 100 Bc (setting time) for each sample is shown in Table 5 below.

TABLE 5

| Sample | Class A Cement (g) | Carbonated Class C Fly Ash (g) | $CaCO_3$ Conc. (%) | Reaction Time (hours) | Setting Time to 100 Bc at 140° F. (min) |
|---|---|---|---|---|---|
| Sample No. 10 | 360 | 240 | 0.2 | 0 | 126.5 |
| Sample No. 11 | 360 | 240 | 0.2 | 1 | 181.3 |
| Sample No. 12 | 360 | 240 | 0.2 | 3 | 261.5 |
| Sample No. 13 | 360 | 240 | 0.2 | 6 | 120.5 |

Figure 4:
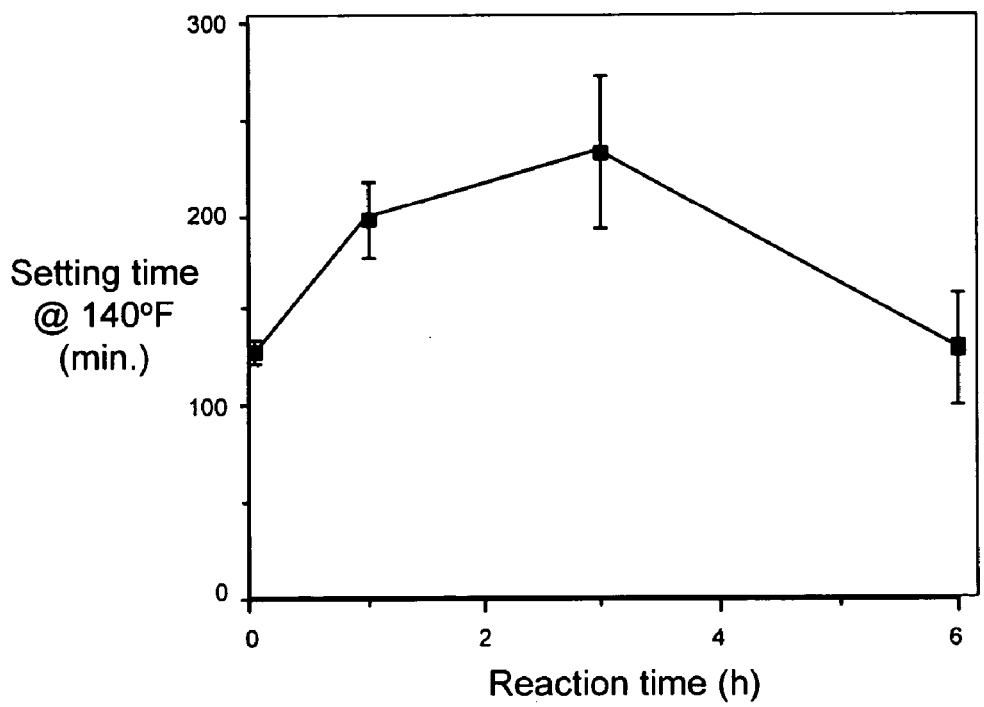
FIG. 4 is a plot of setting time measured at 140° F. for sample cement slurries that comprised a cement/carbonated fly ash mixture as a function of reaction time, for fly ash reacted with a calcium carbonate solution in an amount of 0.2% by weight.

Additionally, a plot of setting time (min) as a function of reaction time (hours) is displayed in FIG. 4. As may be seen on FIG. 4, for a calcium carbonate solution having a given calcium carbonate concentration, increasing the reaction time enhanced the effectiveness of the treatment until about 3 hours was reached. Accordingly, reacting fly ash with the calcium carbonate solution for a longer period of time did not result in further improvement, but rather at some point the setting time decreased.

EXAMPLE 6

To determine how setting time varies with the calcium carbonate concentration, the following experiments were performed. Sample Nos. 14-18 were prepared in accordance with the following procedure. First, 360 g of Texas Lehigh Class A cement were dry blended with 240 grams of carbonated fly ash in a cement-to-carbonated fly ash weight ratio of 60:40. The carbonated fly ash was prepared as described in Example 1 by reacting Class C fly ash with a calcium carbonate solution (0.1% to 0.6%) for 3 hours. For Sample No. 14 indicated in Table 6 below having a 0.0% by weight of calcium carbonate, the fly ash was not treated with the calcium carbonate solution. Next, the samples were mixed with water in a blender and strongly agitated (highest speed) for 35 seconds.

After sample preparation, the samples were placed in a consistometer (Chandler Engineering Model 1250 Atmospheric Consistometer). The consistency (Bc) of each sample was measured at 140° F. (60° C.), until 100 Bc was obtained. The time to reach 100 Bc (setting time) for each sample is shown in Table 6 below.

TABLE 6

| Sample | Class A Cement (g) | Carbonated Class C Fly Ash (g) | $CaCO_3$ Conc. (%) | Reaction Time (hours) | Setting Time to 100 Bc at 140° F. (min) |
|---|---|---|---|---|---|
| Sample No. 14 | 360 | 240 | 0.0 | (Not Treated) | 126.5 |
| Sample No. 15 | 360 | 240 | 0.1 | 3 | 160.0 |
| Sample No. 16 | 360 | 240 | 0.2 | 3 | 208.7 |
| Sample No. 17 | 360 | 240 | 0.4 | 3 | 261.0 |
| Sample No. 18 | 360 | 240 | 0.6 | 3 | 174.5 |

Figure 5:
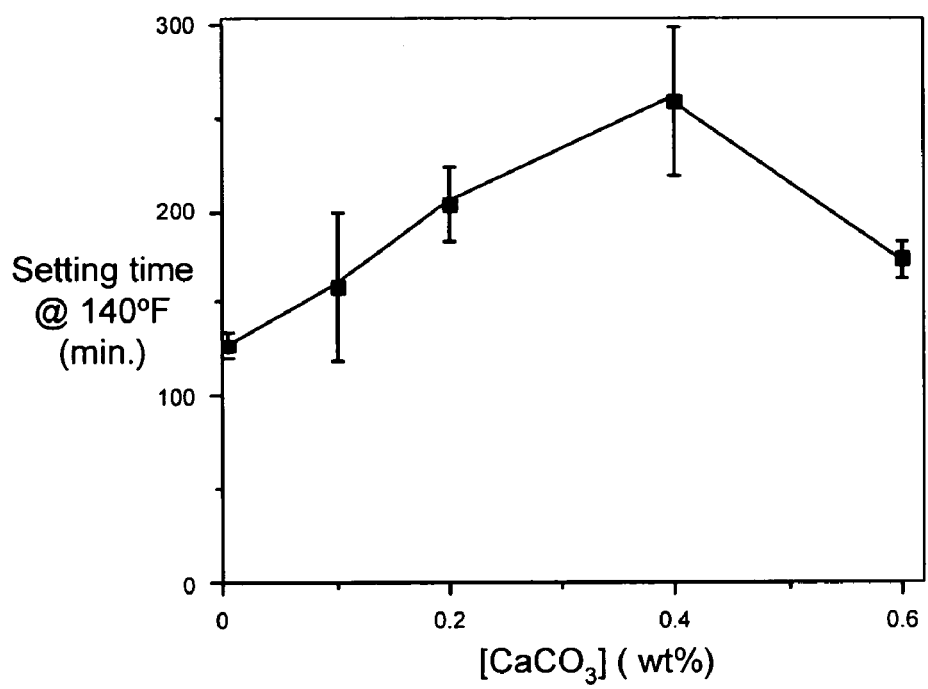
FIG. 5 is a plot of setting time measured at 140° F. for sample cement slurries that comprised a cement/carbonated fly ash mixture as a function of calcium carbonate concentration, for fly ash reacted with a calcium carbonate solution for 3 hours.

Additionally, a plot of setting time (min) as a function of calcium carbonate concentration is displayed in FIG. 5. As may be seen on FIG. 5, for carbonated fly ash with a given reaction time, increasing the concentration of calcium carbonate enhanced the effectiveness of the treatment until about 4 hours was reached. Accordingly, reacting fly ash with increasing concentrations of calcium carbonate did not result in further improvement, but rather at some point the setting time decreased.

EXAMPLE 7

To determine the effectiveness of treatment with calcium carbonate, fly ash was also treated with sodium carbonate and sodium bicarbonate. Samples were prepared in accordance with the following procedure. Each sample was dry blended and then mixed with water in a blender and strongly agitated (highest speed) for 35 seconds. Samples were prepared that comprised a mixture of cement and fly ash, a mixture of cement and carbonated fly ash, a mixture of cement and fly ash treated with sodium carbonate, or a mixture of cement and fly ash treated with sodium bicarbonate.

Sample No. 19 (C/FA) comprised 360 g of Texas Lehigh Class A cement, 240 g of Class C fly ash, and 291.6 g of water.

Sample No. 20 (C/FA-NaHCO$_3$) comprised 360 g of Texas Lehigh Class A cement, 240 g of Class C fly ash treated with sodium bicarbonate, and 291.6 g of water. The fly ash was treated with sodium bicarbonate as described in Example 1, substituting sodium bicarbonate for calcium carbonate and reacting Class C fly ash with an aqueous solution that comprised sodium bicarbonate (0.2%) for 1 hour. Additionally, unlike with calcium carbonate, for sodium bicarbonate, the stirring was performed at room temperature without bubbling carbon dioxide.

Sample No. 21 (C/FA-Na$_2$CO$_3$) comprised 360 g of Texas Lehigh Class A cement, 240 g of Class C fly ash treated with sodium carbonate, and 291.6 g of water. The fly ash was treated with sodium carbonate as described in Example 1, substituting sodium carbonate for calcium carbonate and reacting Class C fly ash with an aqueous solution that comprised sodium carbonate (0.2%) for 1 hour. Additionally, unlike with calcium carbonate, for sodium carbonate, the stirring was performed at room temperature without bubbling carbon dioxide.

Sample No. 22 (C/FA-CaCO$_3$) comprised 360 g of Texas Lehigh Class A cement, 240 g of carbonated Class C fly ash, and 291.6 g of water. Accordingly, Sample No. 22 had a cement-to-carbonated fly ash weight ratio of 60:40. The carbonated fly ash was prepared as described in Example 1 by reacting Class C fly ash with a calcium carbonate solution (0.2%) for 1 hour.

After sample preparation, the samples were placed in a consistometer (Chandler Engineering Model 1250 Atmospheric Consistometer). The consistency (Bc) of each sample was measured at 140° F. (60° C.), until 100 Bc was obtained. The time to reach 100 Bc (setting time) for each sample is shown in Table 7 below.

TABLE 7

| Sample | Class A Cement (g) | Class C Fly Ash (g) | Fly Ash Treatment | Setting Time to 100 Bc at 140°F. (min) |
| --- | --- | --- | --- | --- |
| Sample No. 19 | 360 | 240 | — | 126.5 |
| Sample No. 20 | 360 | 240 | NaHCO$_3$ | 140 |
| Sample No. 21 | 360 | 240 | Na$_2$CO$_3$ | 144 |
| Sample No. 22 | 360 | 240 | CaCO$_3$ | 181.3 |

Figure 6:
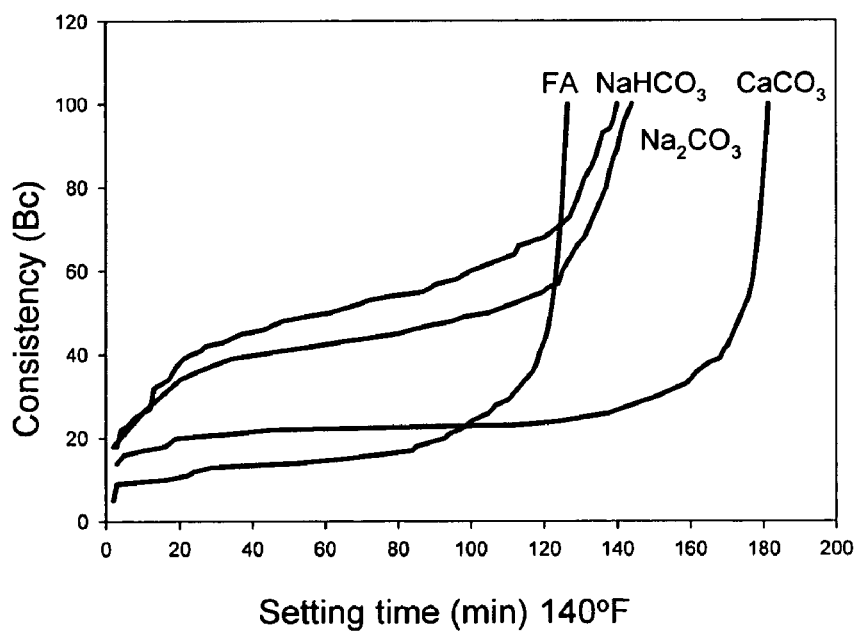
FIG. 6 is a plot of consistency (Bc) measured at 140° F. as a function of time for a sample cement slurry that comprised a cement/fly ash mixture (C/FA), a sample cement slurry that comprised a cement/carbonated fly ash mixture (C/FA-$CaCO_3$), a sample cement slurry that comprised a mixture of cement and fly ash treated with sodium carbonate (C/FA-$Na_2CO_3$), and a sample cement slurry that comprised a mixture of cement and fly ash treated with sodium bicarbonate (C/FA-$Na_2CO_3$).

Additionally, a plot of consistency (Bc) as a function of setting time (min.) for each sample is displayed in FIG. 6. As may be seen on FIG. 6, reacting fly ash with calcium carbonate, as compared to sodium carbonate or sodium bicarbonate, provided a slurry that reached a specific viscosity that remained constant until setting took place.

EXAMPLE 8

Carbonated fly ash was prepared in accordance with the following procedure. An Erlenmeyer flask of 1,000 ml was filled with 600 ml of distilled water. A heating plate was used to bring the water to a boil. Next, a carbon dioxide gas was purged through the water and the wet carbon dioxide was carried further through a cold trap attached to a round bottom flask loaded with 300 g of fly ash. The fly ash powder was continuously stirred during the exposure to the wet carbon dioxide treatment. The exposure time of treating fly ash with the wet carbon dioxide was varied from 2 hours to 6 hours. After treatment the carbonated fly ash was used further for consistency measurements. Alternatively, the treatment can be performed by purging the carbon dioxide directly into the flask with the fly ash and carrying the water vapor separately to the fly ash flask under continuous agitation.

EXAMPLE 9

Samples were prepared in accordance with the following procedure. Each sample was dry blended and then mixed with water in a blender and strongly agitated (highest speed) for 35 seconds.

Sample No. 23 (C) comprised 600 g of Texas Lehigh Class A cement and 291.6 g of water.

Sample No. 24 (C/FA) comprised 360 g of Texas Lehigh Class A cement, 240 g of Class C fly ash, and 291.6 g of water. Accordingly, Sample No. 24 had a cement-to-fly ash weight ratio of 60:40.

Sample No. 25 (C/wCO$_2$-FA) comprised 360 g of Texas Lehigh Class A cement, 240 g of carbonated Class C fly ash, and 291.6 g of water. Accordingly, Sample No. 25 had a cement-to-carbonated fly ash weight ratio of 60:40. The carbonated fly ash was prepared as described in Example 8 by reacting Class C fly ash with wet carbon dioxide gas for 5 hours.

After sample preparation, the samples were placed in a consistometer (Chandler Engineering Model 1250 Atmospheric Consistometer). The consistency (Bc) of each sample was measured at 140° F. (60° C.), until 100 Bc was obtained. The time to reach 100 Bc (setting time) for each sample is shown in Table 8 below.

TABLE 8

| Sample | Class A Cement (g) | Class C Fly Ash (g) | Carbonated Class C Fly Ash (g) | Setting Time to 100 Bc at 140° F. (min) |
| --- | --- | --- | --- | --- |
| Sample No. 23 (C) | 600 | — | — | 27 |
| Sample No. 24 (C/FA) | 360 | 240 | — | 127 |
| Sample No. 25 (C/wCO$_2$-FA) | 360 | — | 240 | 124.3 |

Figure 7:
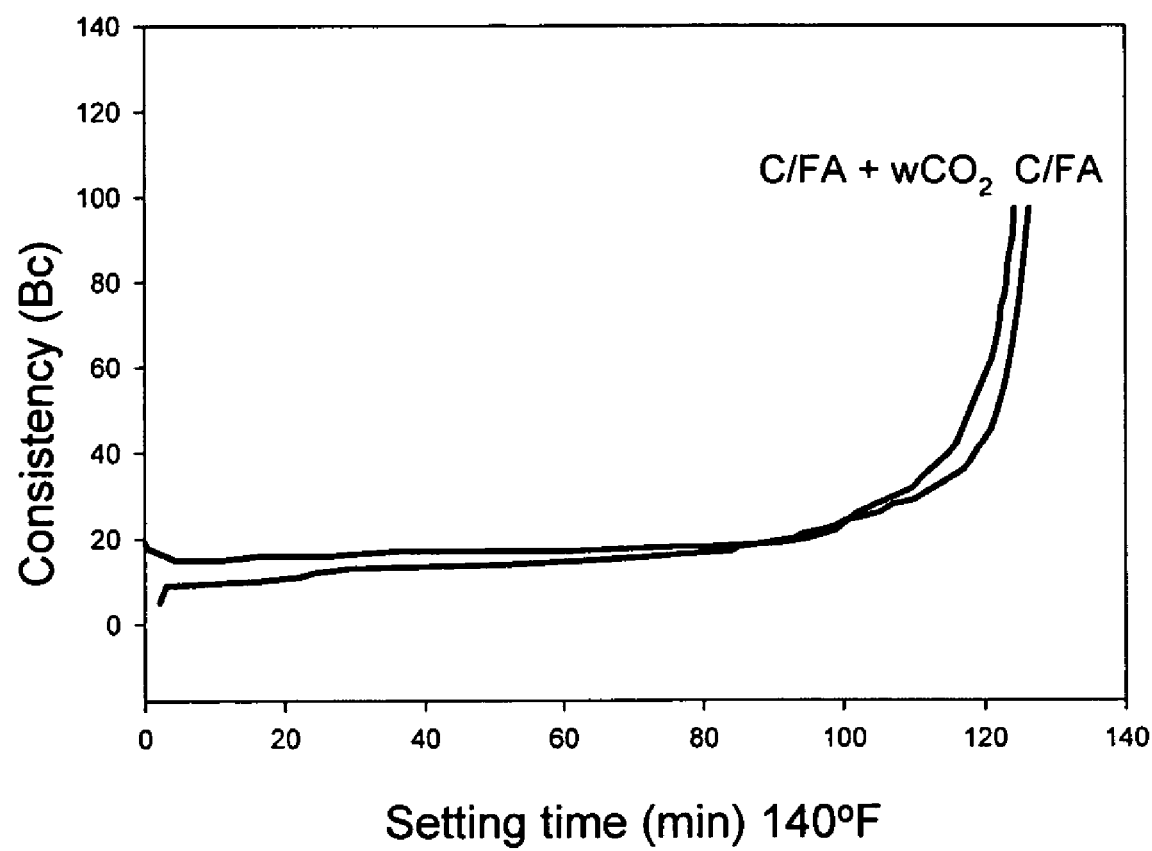
FIG. 7 is a plot of consistency (Bc) measured at 140° F. as a function of time for a sample cement slurry that comprised a cement/fly ash mixture (C/FA), and a sample cement slurry that comprised a cement/carbonated fly ash mixture (C/w$CO_2$FA).

Additionally, a plot of consistency (Bc) as a function of setting time (min.) for Sample Nos. 24 and 25 is displayed in FIG. 7. As shown in FIG. 7, the substitution of the fly ash with carbonated fly ash reacted in Sample No. 25 (C/CFA) significantly changed the profile of the setting curve, in that the induction profile for Sample No. 25 (C/CFA) was more flat and controlled. Accordingly, Example 9 indicates that the slurry that comprised the cement/carbonated fly ash mixture reached a specific viscosity that remained constant until setting took place.

While embodiments of this disclosure have been depicted, described, and are defined by reference to embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method of treating fly ash to modify the set time and the induction profile for a cement slurry comprising:
   providing fly ash;
   providing an aqueous solution comprising calcium carbonate;
   mixing the fly ash with the aqueous solution comprising the calcium carbonate so as to produce carbonated fly ash; and
   mixing the carbonated fly ash with the cement slurry, thereby modifying the set time and the induction profile of the cement slurry.

2. The method of claim 1 wherein the fly ash is selected from the group consisting of Class C fly ash, Class F fly ash, Class I fly ash, and combinations thereof.

3. The method of claim 1 wherein the calcium carbonate is present in the aqueous solution in an amount in the range of from about 0.01 moles per liter to about 0.6 moles per liter of the aqueous solution.

4. The method of claim 1 further comprising flowing a gas stream comprising carbon dioxide through the aqueous solution comprising the calcium carbonate while mixing the fly ash with the aqueous solution comprising the calcium carbonate.

5. The method of claim 1 further comprising heating the mixture of the fly ash and the aqueous solution comprising the calcium carbonate.

6. The method of claim 1 further comprising removing at least a substantial portion of the fly ash from the mixture of the fly ash and the aqueous solution comprising the calcium carbonate.

7. The method of claim 6 further comprising drying the fly ash that was removed from the mixture.

8. The method of claim 7 wherein the step of drying the fly ash comprises heating the fly ash.

9. The method of claim 1 further comprising contacting the fly ash with a wet gas stream comprising water vapor and carbon dioxide in an amount sufficient to react with the fly ash.

10. The method of claim 9 wherein the step of contacting the fly ash with the wet gas stream occurs prior to the step of mixing the fly ash with the aqueous solution comprising the calcium carbonate.

11. A method of treating fly ash to modify the induction profile of a cement slurry comprising:

providing fly ash;

providing a wet gas stream comprising water vapor and carbon dioxide in an amount sufficient to react with the fly ash;

contacting the fly ash with the wet gas stream so as to produce carbonated fly ash; and mixing the carbonated fly ash with the cement slurry, thereby modifying the induction profile of the cement slurry.

12. The method of claim 11 wherein the fly ash is contacted with the wet gas stream for a period of time of from about 5 hours to about 10 hours.

13. The method of claim 11 further comprising flowing a gas stream comprising carbon dioxide through a volume of water to obtain the wet gas stream.

14. The method of claim 13 wherein the gas stream is an exhaust stream.

15. The method of claim 11 wherein the carbon dioxide is present in the wet gas stream in an amount greater than about 0.002 moles per liter of the wet gas stream.

16. The method of claim 11 further comprising mixing the fly ash with an aqueous solution comprising calcium carbonate.

17. The method of claim 16 wherein the step of mixing the fly ash with the aqueous solution occurs prior to the step of contacting the fly ash with the wet gas stream.

18. The method of claim 16 further comprising drying the fly ash, after mixing the fly ash with the aqueous solution comprising the calcium carbonate.

* * * * *